United States Patent
Gräber

(10) Patent No.: US 10,513,331 B2
(45) Date of Patent: Dec. 24, 2019

(54) HELICOPTER

(71) Applicant: Andreas Gräber, Karlsruhe (DE)

(72) Inventor: Andreas Gräber, Karlsruhe (DE)

( * ) Notice: Subject to any disclaimer, the term of this patent is extended or adjusted under 35 U.S.C. 154(b) by 546 days.

(21) Appl. No.: 15/309,490

(22) PCT Filed: May 6, 2015

(86) PCT No.: PCT/EP2015/000923
§ 371 (c)(1),
(2) Date: Nov. 8, 2016

(87) PCT Pub. No.: WO2015/169442
PCT Pub. Date: Nov. 12, 2015

(65) Prior Publication Data
US 2017/0152034 A1    Jun. 1, 2017

(30) Foreign Application Priority Data
May 8, 2014  (DE) .................. 20 2014 003 903 U

(51) Int. Cl.
| | |
|---|---|
| *B64C 27/72* | (2006.01) |
| *B64C 27/02* | (2006.01) |
| *B64C 27/12* | (2006.01) |
| *B64C 27/08* | (2006.01) |
| *B64C 27/605* | (2006.01) |

(52) U.S. Cl.
CPC .............. *B64C 27/72* (2013.01); *B64C 27/024* (2013.01); *B64C 27/08* (2013.01); *B64C 27/12* (2013.01); *B64C 27/605* (2013.01); *B64C 2027/7255* (2013.01)

(58) Field of Classification Search
CPC ....... B64C 27/72; B64C 27/024; B64C 27/08; B64C 27/12; B64C 27/605; B64C 2027/7255
See application file for complete search history.

(56) References Cited

U.S. PATENT DOCUMENTS

| | | | |
|---|---|---|---|
| 3,246,861 A | 4/1966 | Curci | |
| 3,762,669 A | 10/1973 | Curci | |
| 5,931,639 A | 8/1999 | Morris | |
| 2010/0025525 A1* | 2/2010 | Van de Rostyne | .... A63H 27/12 244/17.19 |
| 2011/0180673 A1 | 7/2011 | Lim | |
| 2012/0070279 A1 | 3/2012 | Bauchot et al. | |
| 2012/0189450 A1 | 7/2012 | Jarvis et al. | |
| 2012/0282090 A1 | 11/2012 | Bauchot et al. | |
| 2017/0307090 A1* | 10/2017 | DeFusco | .............. F16K 11/161 |

FOREIGN PATENT DOCUMENTS

| | | |
|---|---|---|
| DE | 10 15 318 B | 9/1957 |
| FR | 1 073 268 A | 9/1954 |
| GB | 2 495 562 A | 4/2013 |

* cited by examiner

*Primary Examiner* — Rodney A Bonnette
(74) *Attorney, Agent, or Firm* — McGlew and Tuttle, P.C.

(57) ABSTRACT

A helicopter has a helicopter body with a longitudinal axis and a rotor head which is driven via the rotor drive axis. The helicopter further has at least two rotor blades held via one rotor blade shaft each. In order to permit higher speeds, a rotor bearing axis of the rotor blade shafts is adjustable perpendicular to a direction of extent of the rotor bearing axis in relation to the rotor drive axis.

41 Claims, 12 Drawing Sheets

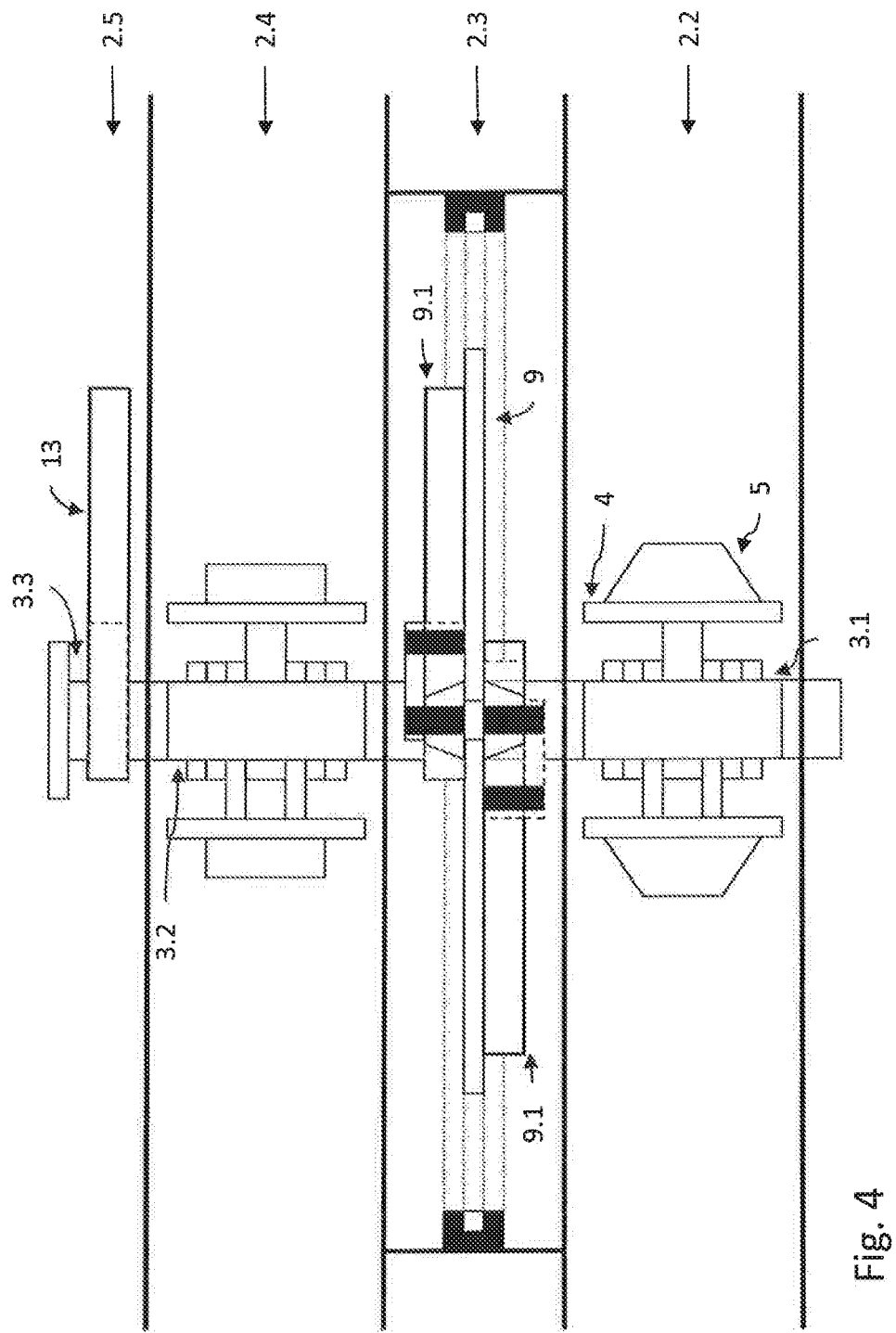

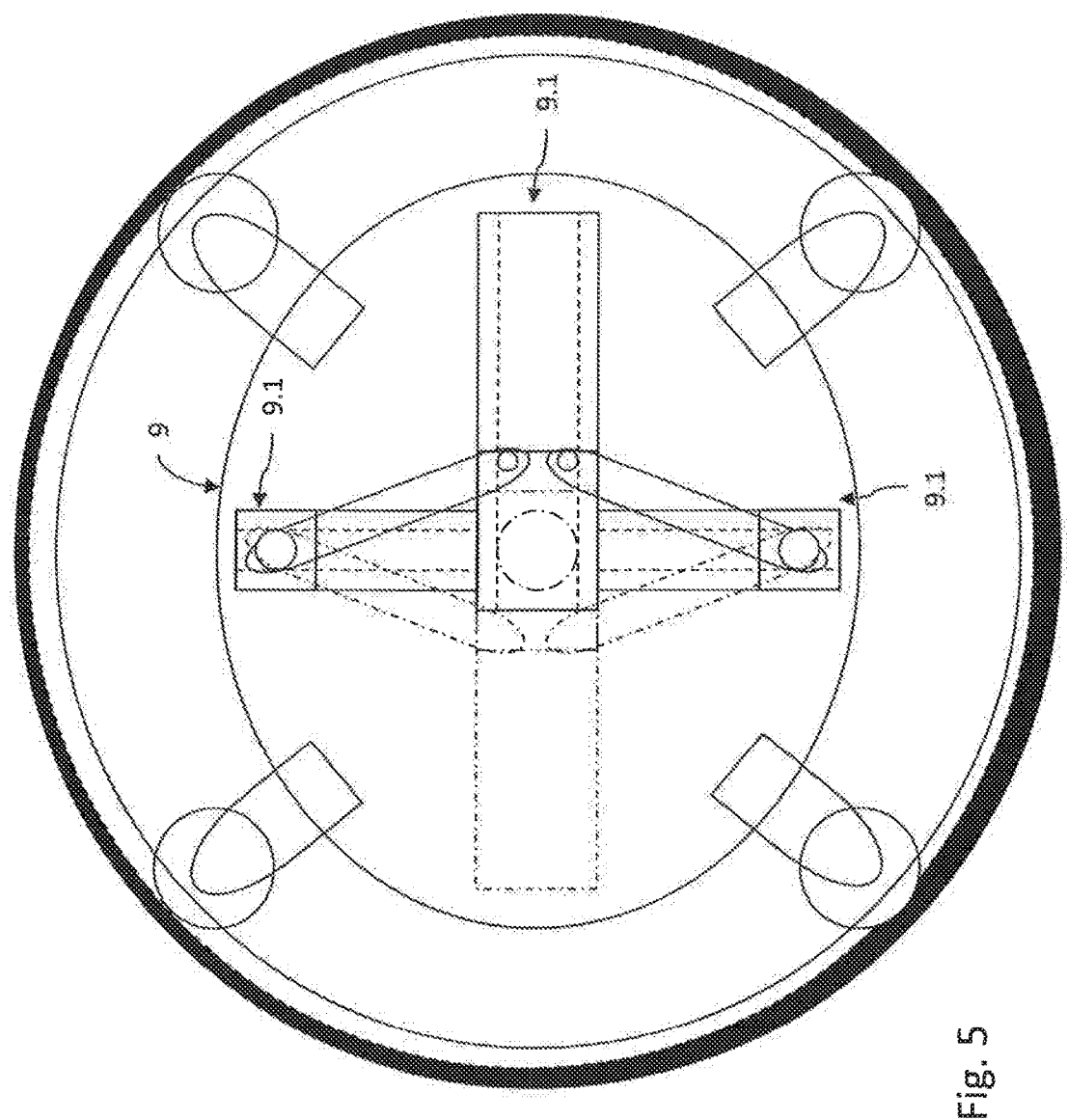

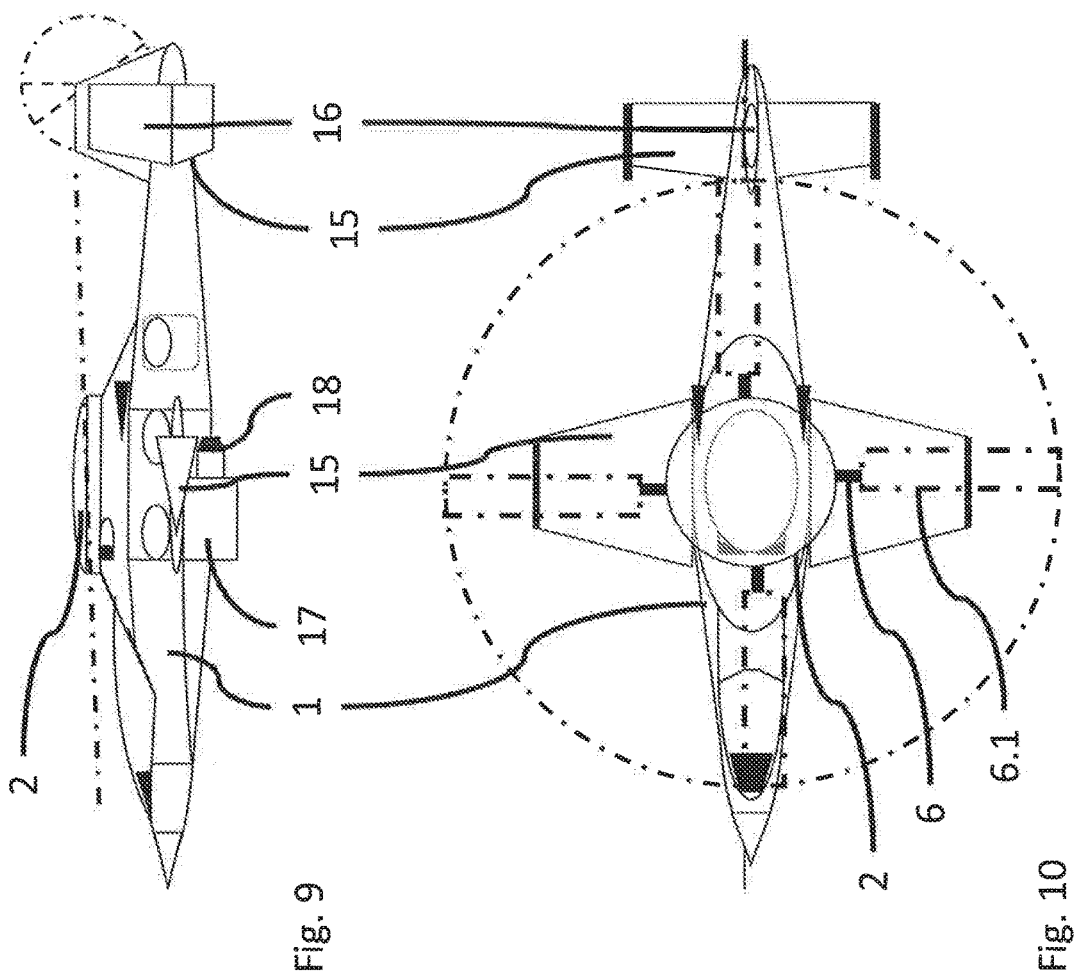

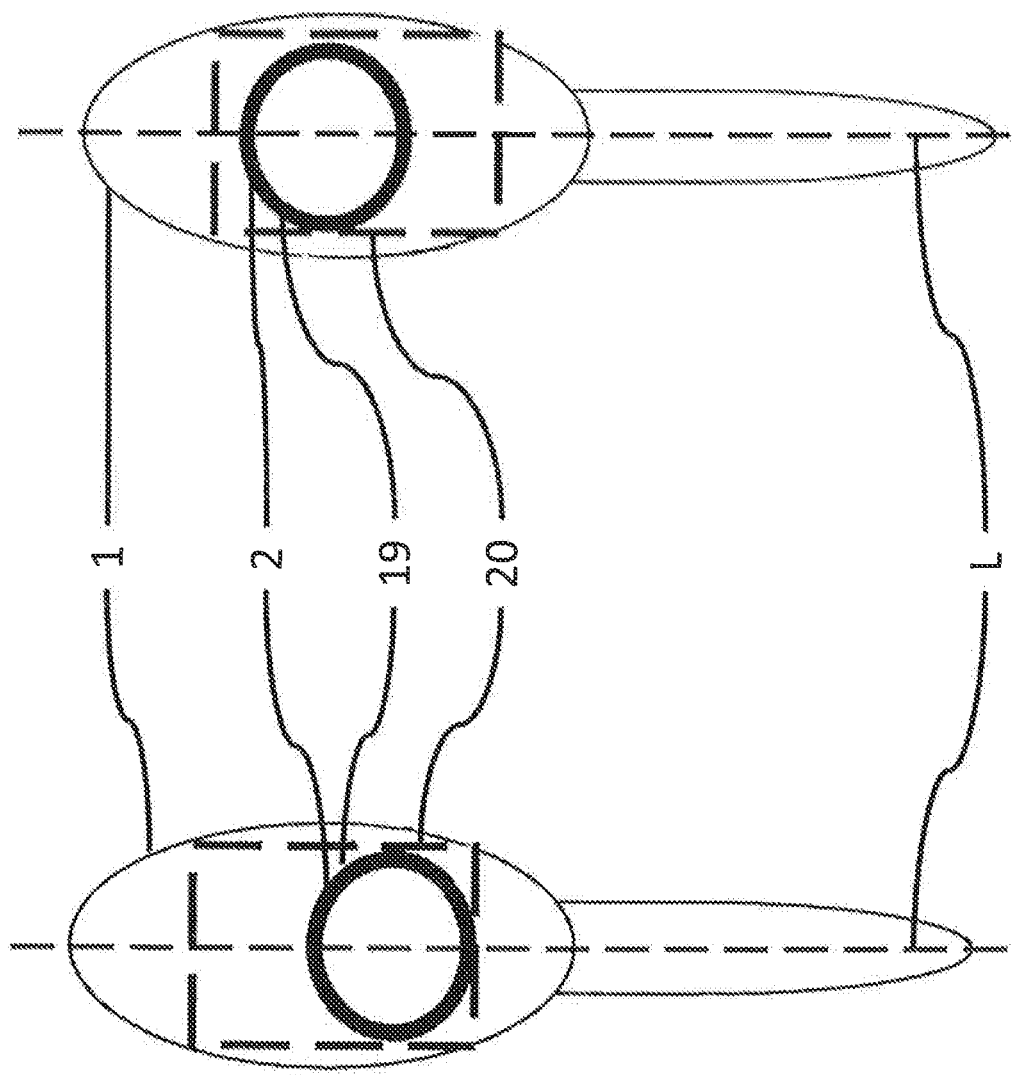

HELICOPTER

CROSS REFERENCE TO RELATED APPLICATIONS

This application is a United States National Phase Application of International Application PCT/EP2015/000923 filed May 6, 2015, and claims the benefit of priority under 35 U.S.C. § 119 of German Application 20 2014 003 903.8 filed May 8, 2014, the entire contents of which are incorporated herein by reference.

FIELD OF THE INVENTION

The invention relates to a helicopter having a helicopter body with a longitudinal axis and a rotor head which is driven about a rotor drive axis and has at least two rotor blades held via one rotor blade shaft each.

BACKGROUND OF THE INVENTION

According to the current prior art, helicopters reach top speeds of up to a maximum approx. 360 km/h. The rotor drive axis, about which the rotor blades rotate, always coincides here with the rotor bearing axis, about which the rotor blade shafts are fastened. Said rotor bearing axis is formed mechanically by the rotor shaft. During hovering flight, all of the points on all of the rotor blades of a rotor that are equally far away from the rotor drive axis have, given an identical angular speed (dimension $Z^{-1}$), the same rotational speed (dimension $L \times Z^{-1}$), i.e. cover distances of equal length at the same time. Points in the vicinity of the rotor drive axis have a lower rotational speed here than points further away therefrom. If the helicopter moves forwards with a certain translational speed, the rotational speed of the rotor blades is superimposed on the translational speed of the helicopter.

In the following, a rotor system is referred to as "anticlockwise" in which its rotor blades rotate anticlockwise in a top view of the helicopter. The following directional details always refer to a top view of the helicopter from above, with the front oriented upwards in the plane of the drawing. The rotational phase of a rotor blade indicates the current position in relation to the axis of rotation of the rotor.

In the case of an anticlockwise rotor system, the translational speed of the helicopter itself is added to the rotational speed of the rotor blade on the right side, while the translational speed is subtracted from the rotational speed of the rotor blade on account of the opposed movement of the rotor blade in order in each case to obtain the speeds of the respective rotor blade above ground. The different effect of the translational speed of the helicopter on the speeds of the rotor blades above ground depending on the rotational phase thereof gives rise to a speed profile of the rotor blades in accordance with their position. In the case of an anticlockwise rotor system, the maximum of said profile is located on the right side and the minimum on the left side. The differences therebetween is all the more greater, the greater the translational speed of the helicopter. When the rotors are on the right side, a higher air resistance therefore prevails, whereas the air resistance is lower on the left side. This results in a correspondingly different air resistance on the right and left side. Both effects can be compensated for via a change in the angle of inclination of the rotor blades in relation to the horizontal until the air flow stalls because of too great an air resistance at a speed which is (too) high. This is the limiting factor for achieving higher translational speeds.

SUMMARY OF THE INVENTION

It is an object of the invention to develop a helicopter with which the limiting disadvantages are eliminated and with which a greater maximum translational speed can be achieved.

The invention achieves the object with a helicopter of the type in question which is characterized in that a rotor bearing axis of the rotor blade shafts is adjustable perpendicular to a rotor bearing axis direction of extent in relation to the rotor drive axis.

By this means, an adaptation of the rotor blade length with respect to the rotor drive axis depending on the translational speed of the helicopter can be achieved. The rotor has two or more rotor blades, in particular two to six, preferably three, four or five rotor blades.

The rotor blade is effectively extended on one side relative to the rotor drive axis, which results in a greater rotational speed and therefore also in a greater speed of the rotor above ground. This ideally takes place at that rotational phase in which the previous speed of the rotor above ground was reduced because of the translational speed of the helicopter. However, it is essential that, in a corresponding manner on the opposite side, the speed of the rotor blade above ground is reduced and the speed profile is therefore configured to be more balanced.

The axis of rotation and the rotor bearing axis can preferably be formed separately from each other. By means of the structurally separate configuration, the adaptation of the rotor bearing axis to the flight state of the helicopter can be carried out simply and rapidly.

It may be of advantage for the rotor bearing axis to be designed to be adjustable with a component perpendicular to the longitudinal axis of the helicopter body, in particular so as to be adjustable to both sides of the longitudinal axis of the helicopter body, in particular perpendicular to said longitudinal axis. An adaptation of the rotor bearing axis to different configurations of helicopters is therefore possible. In the case of an anticlockwise helicopter, as already mentioned, the speed profile of the rotor blades at high translational speeds can be balanced by an adjustment of the rotor bearing axis to the left, as seen in the flight direction. In the case of a clockwise helicopter, the conditions are reversed. By the rotor bearing axis being configured to be adjustable to both sides, compensation of different speed profiles of various types of helicopter is possible.

It can be provided that the rotor shaft is divided into a plurality of parts. In particular, said parts can comprise at least two parts which are movable perpendicular to the rotor axis and at least one part which is rigid in relation to the rotor head (rotor bearing shaft, additional rotor bearing shaft configured as movable parts and rotor guide shaft as a rigid part). The rotor head can hold the at least two rotor blades here in at least one rotor blade segment. According to a preferred configuration, at least one additional rotor blade segment can be provided, the design of which may resemble the rotor blade segment. The additional rotor blade segment or the additional rotor blade segments can be coupled to the rotor blade segment. This makes it possible for a correspondingly desired adjustment of the additional rotor blade shafts of the additional rotor blade segment to be achieved by the adjustment of the rotor blade shafts of the respective rotor blade segment. As a result, by a movement of the rotor shaft, which guides the rotor blades of a rotor, independently of the remaining components, an adaptation of the rotor blade position to the translational speed of the helicopter is achieved. This likewise relates to the enabling of opposed deflections of the movable parts of the rotor shaft. For this purpose, the movable parts of the rotor shaft, for example rotor bearing shaft and additional rotor bearing shaft, can be deflectable in an opposed manner and, as a result, the rotor blade shafts and the additional rotor blade shafts are movable in an opposed manner with respect to one another.

For a simplified structural configuration, the plurality of parts of the rotor shaft follow one another in their axial direction.

According to a preferred configuration, there is a sinusoidal adjuster by means of which a rotor shaft, the axis of symmetry of which is the rotor bearing axis, is adjustable perpendicular to the latter. The sinusoidal adjuster is indirectly or directly connected to the rotor blade shafts and adjusts the latter perpendicular to the direction of extent of the rotor bearing axis via the rotor shaft. The rotor shaft can be adjusted here in one or in two dimensions. The amplitude is freely selectable and can be directed in particular in accordance with the translational speed of the helicopter. In the abovementioned example of an anticlockwise rotor, the sinusoidal adjuster ensures that the distance of the rotor blade located on the right side of the helicopter is shortened in relation to the axis of rotation of the rotor and that of the rotor blade located on the left is increased with respect to the axis of rotation of the rotor. This orientation can be produced for each rotor position and is therefore continuously adjusted over the entire flight duration. Preferably, at least two rotor blade shafts are connected to the rotor shaft and are adjustable therewith.

It can furthermore be provided to guide the rotor blade shafts fixedly, but not non-rotatably, in oscillating bearings and to move the rotor blade shafts radially with respect to the rotor drive axis by adjustment of the sinusoidal adjuster. In the process, the distance of the rotor blades from the rotor drive axis changes depending on the adjustment by the sinusoidal adjuster.

Furthermore, it can be provided that the drive of the rotor blades takes place via the rotor head itself. The rotor drive axis can coincide with the vertical axis of symmetry of the rotor head. The drive force is transmitted here from oscillating bearings via rotor rings as far as the rotor blade shafts. This includes a preferred structural realization of the separation of rotor drive axis and rotor bearing axis. When the rotor bearing axis is adjusted by the sinusoidal adjuster perpendicular to the rotor bearing axis, the rotor drive axis remains unchanged. The radial distances of the rotor blades from the rotor drive axis can thus be coordinated with the translational speed of the helicopter. If the translational speed of the helicopter increases, a greater displacement of the rotor blade shafts can be brought about by means of a greater deflection of the sinusoidal adjuster, which, as mentioned above, results in a balancing of the speed profile mentioned depending on the rotor phase of the helicopter. The rotor rings can be connected here to the oscillating bearings.

It can furthermore be provided that rotor rings of different rotor blade segments are coupled to one another. As a result, a uniform rotational speed of the individual segments can be ensured.

The rigid part of the rotor shaft can be connected fixedly, for example, to the rotor head. This serves for the consistent transmission of the forces arising at the rotor shaft to the rotor head and also for the increase in the stability of the construction as a whole, both statically and dynamically.

In a particularly advantageous refinement, it can be provided to fasten at least two rotor blade shafts independently of one another to part of the rotor shaft and, as a result, to move individual rotor blade shafts independently of one another.

It can furthermore be provided that one or more rotor blade shafts is or are connected to a swashplate. This permits an individual setting of the angle of inclination of the rotor blade shafts individually connected to the swashplate and, as a result, adaptation of the air resistance of the rotor blade to the requirements of the current flight behavior.

In a preferred refinement, the additional rotor blade segment can be arranged above and/or below the rotor blade segment. In a further preferred refinement, the additional rotor blade segment can have, instead of rotor blades, additional weights on the rotor blade shafts. The mass of said additional weights may be temporally fixed or variable. They can contain solid, liquid or gaseous material.

The coupling of the additional rotor blade segment to the rotor blade segment can be realized, for example, by a scissor-type segment with sliding pieces and sliding rails. The type and manner of the coupling is achieved by the construction of the scissor-type segment. The type of coupling and the design of the additional weights are coordinated here with the flight behavior of the helicopter in order to ensure the best possible stability by compensating for imbalances which arise.

In a preferred embodiment, the additional rotor blade shafts of the additional rotor blade segment can be identical in construction to the rotor blade shafts of the rotor blade segment. This embodiment permits efficient production and implementation since the additional rotor blade shafts of the additional rotor blade segment in particular have the same length as the rotor blade shafts of the rotor blade segment. The weights are correspondingly adapted in order to ensure compensation for existing imbalances and a greatest possible stability of the helicopter in flight.

A further preferred embodiment can make provision for the length of the rotor blade shafts to be different from the rotor blade shafts of the rotor blade segment in the additional rotor blade segment or in the additional rotor blade segments which are present. The parameters of the weights are also adapted here such that the greatest possible stability of the helicopter in flight is achieved. This embodiment of the additional rotor blade segment results in an improved flight performance as a consequence of a dynamically and aerodynamically optimized configuration of the additional rotor blade segment and of a therefore changed constructional form of the rotor head.

A further preferred embodiment can provide a further development according to the invention of the coaxial rotor construction that is already known from the prior art. It is provided here that the additional rotor blade segment is provided with additional rotor blades. For example, there are thus two rotor blade segments which lie axially one above the other and have opposed directions of rotation. As a result, the torques of the two rotor blade segments are balanced. The coupling mechanism, which is required for this purpose, between the two rotor blade segments can be undertaken by means of bevel gears in a coaxial scissor-type segment. This construction requires an additional swashplate for setting the angle of inclination of the additional rotor blade shafts of the additional rotor blade segment, which additional rotor blade shafts are fitted with rotor blades instead of weights. An embodiment according to the invention of the further development of this construction makes provision to decouple the rotor drive axis from the rotor bearing axis of the coaxial rotor. The rotor bearing axis is adjusted by a further sinusoidal adjuster which is preferably mounted in the coaxial scissor-type segment.

The direction of rotation of the rotor blade segment is preferably coupled to that of at least one additional rotor blade segment, in particular via bevel gears in a groove ring which is provided in a coaxial scissor-type segment. Synchronous or opposed rotational movements are therefore possible.

In particular, in a particularly preferred embodiment, the additional rotor is adjusted via a threaded spindle and sliding pieces which are uniformly adjustable in relation to one another. This can be brought about both electrically and hydraulically via connections which are guided in the main axis. There is preferably at least one additional swashplate which activates at least one additional rotor blade segment. Furthermore, at least one of the swashplates can be installed in the rotor head, particularly preferably in the rotor cover. This results in advantages because of the short mechanical coupling to the rotor blade shafts via linkages and levers. At least one of the swashplates can be connected to at least one of the additional swashplates, for example via linkages and levers, in order to permit a synchronous change in the angle of inclination of the rotor blade shafts and of the additional rotor blade shafts.

Aerofoils and/or rudder units can preferably be arranged on the helicopter body. A part of the aerofoils can be provided as an elevator unit, wherein, most preferably, the elevator unit is attached to the helicopter body in front of the aerofoils, as seen in the flight direction. By this means, a stable flight position and maneuverability is ensured even when the translational speed of the helicopter increases. In addition, the drive properties are improved.

Most preferably, the aerofoils can be provided rotatably on the helicopter, wherein they are rotatable in particular by an angle of at least 90°. A purely aerodynamic balancing of the torque of the main rotor is therefore possible. Further advantages include a reduction in noise of the rotor and the possibility of a forwards and/or rotational movement about the particular axis in hovering flight.

A generator which preferably has turbines, piston engines, fuel cells and/or accumulators can be provided as the primary drive in the helicopter body. Even higher translational speeds can therefore be achieved and also a thrust reversal made possible, and therefore the helicopter can be rapidly braked.

A bearing ring is preferably mounted movably in an adjustable slide in the helicopter body, wherein the bearing ring is connected to the rotor head, and the bearing ring is displaceable with the rotor head in the direction of the longitudinal axis of the helicopter body. When the translational speed increases, the centre of gravity of the lift always shifts further to the rear counter to the flight direction, and therefore the load centre of the helicopter shifts forwards. By displacement of the rotor head forwards in the direction of the front of the helicopter, the centre of gravity of the lift can be moved again into the vicinity of the centre of gravity of the helicopter. The fuselage of the helicopter therefore remains aerodynamic and with as little end surface as possible in the airflow. A higher maximum translational speed and also a favorable flight position and a more rapid lateral movement are therefore achieved.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4 is a sectional view through the central scissor-type segment between the rotor blade segment and the additional rotor blade segment in an undeflected position;

FIG. 5 is a top view of the undeflected scissor-type segment in a preferred embodiment;

FIG. 9 is a side view of a further configuration of a helicopter according to the invention with aerofoils and a primary drive;

FIG. 10 is a top view of the helicopter from FIG. 9;

FIG. 11 is a schematic top view of a further configuration of a helicopter according to the invention with an adjustable slide and a bearing ring; and FIG. 12 is a schematic top view of the helicopter from FIG. 11 with an adjusted bearing ring.

DESCRIPTION OF THE PREFERRED EMBODIMENTS

Figure 1:
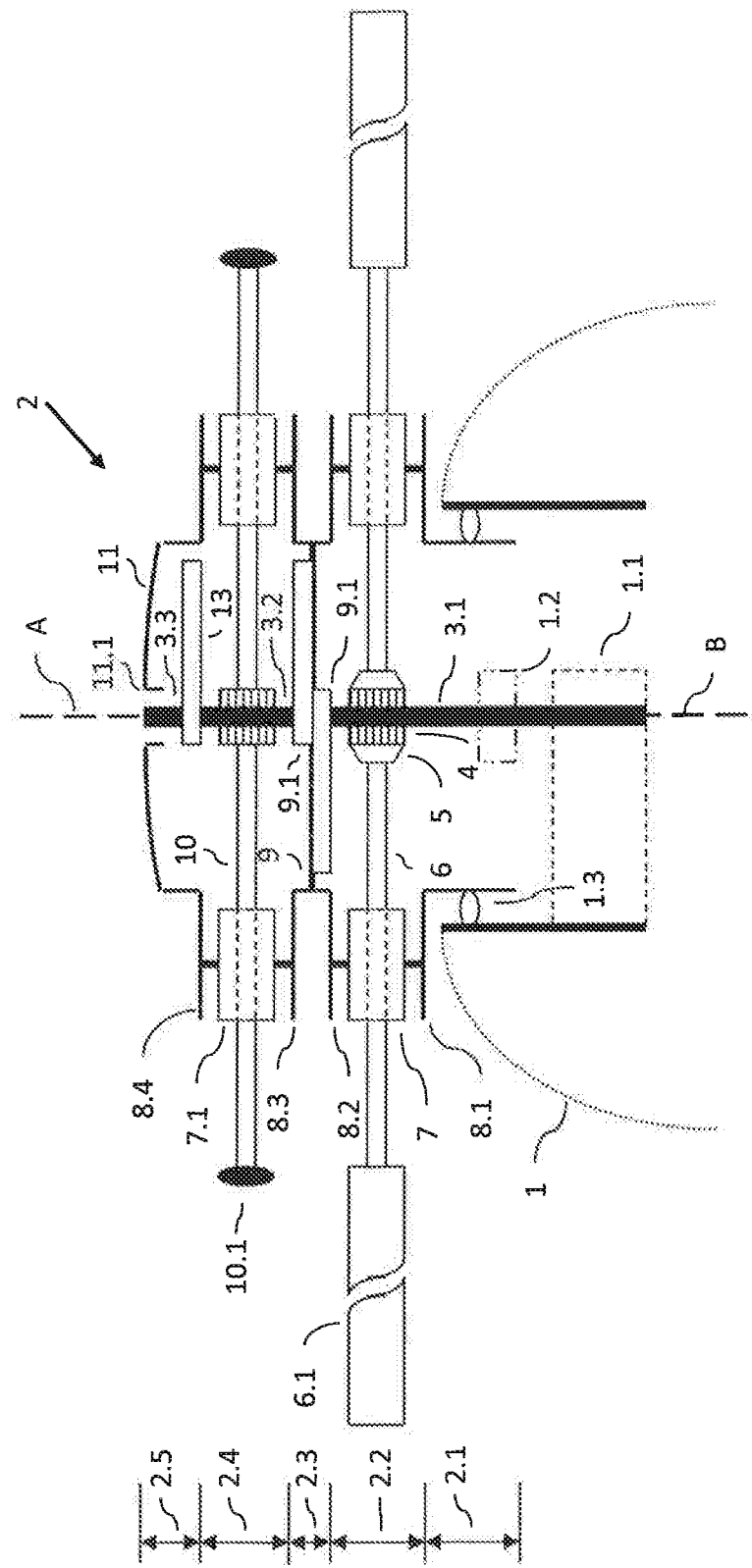
FIG. 1 is a view showing a preferred embodiment of the helicopter according to the invention in an undeflected state in vertical section with direction of view from the rear or in the flight direction of the helicopter.

Referring to the drawings, FIG. 1 shows a preferred embodiment of the helicopter according to the invention. The latter has a helicopter body 1 with a longitudinal axis L which runs perpendicular to the plane of the drawing and is therefore not illustrated, and a rotor head 2. The rotor head 2 is designed as a rotor housing and has a rotor shaft 3 which itself is not driven according to the invention and is illustrated here consisting of three parts which axially follow one another: rotor bearing shaft 3.1, additional rotor bearing shaft 3.2 and rotor guide shaft 3.3. Rotor blade shafts 6 extending perpendicular to the rotor bearing shaft 3.1 are connected to the rotor bearing shaft 3.1 via a rotor blade shaft bearing 4 and are also pivotable in a radial plane with respect to the rotor bearing shaft 3.1. An actual rotor blade 6.1 is located at the outer end of each rotor blade shaft 6.

Figure 2:
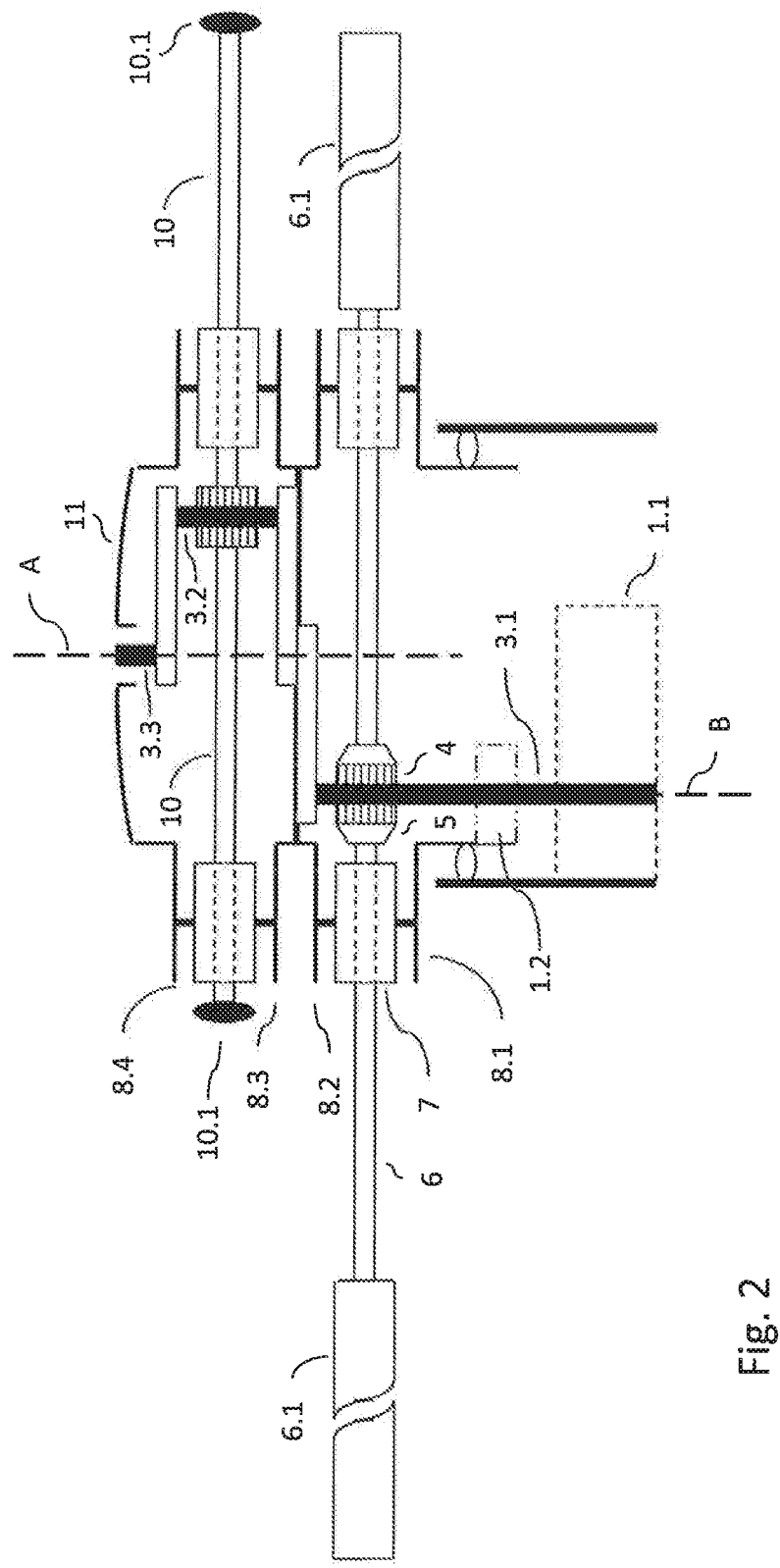
FIG. 2 is a schematic sectional illustration of the embodiment of FIG. 1 with deflected rotor head with correspondingly deflected sinusoidal adjuster and rotor blade shafts.

The-non-driven-rotor bearing shaft 3.1 is itself mounted in a sinusoidal adjuster 1.1 arranged in the helicopter body 1 and is displaceable perpendicular to its direction of extent and perpendicular to the flight direction of the helicopter by said sinusoidal adjuster (FIG. 2).

The rotor head 2 designed as a rotor housing is driveable via a cylinder-jacket-shaped drive shaft 1.3 protruding upwards out of the helicopter body 1. The precise drive is not illustrated and can be undertaken by a drive motor via a customary gearbox. The drive shaft 1.3 surrounds the rotor bearing shaft 3.1 at a large radial distance, and therefore sufficient clearance laterally is provided for the lateral displacement of the rotor bearing shaft 3.1 relative to the rotor drive axis A of the drive shaft 1.3.

The drive shaft 1.3 drives the driven rotor head 2, which is designed as a rotor housing. For this purpose, said drive shaft is first of all connected via lower rotor rings 8.1 to oscillating bearings 7 for the rotor blade shafts 6. By this means, the rotor blade shafts 6 and therefore the rotor blades 6.1 are rotationally driven, but are displaceable radially with respect to the rotor bearing shaft 3.1 and along their own extent in the oscillating bearings 7.

According to the above description, the construction of the rotor head 2 can accordingly be divided into a drive part 1.3, 7, 8.1 and a bearing part 3.1, 4, 6.

The further parts of the rotor head concern balancing an imbalance and are described further below.

By means of the laterally displaceable configuration of the rotor bearing shaft 3.1 with separation of rotor bearing shaft 3.1 and therefore also of the rotor shaft 3 per se and drive shaft 1.3 of the rotor blades 6.1, the latter can be displaced from the normal position or starting position illustrated in FIG. 1 into the flight position illustrated in FIG. 2, in particular for high translational speeds of the helicopter. FIG. 2 shows, in section here, the position of the adjusted rotor blades for an anticlockwise rotor, in the view from the rear.

Figure 3A:
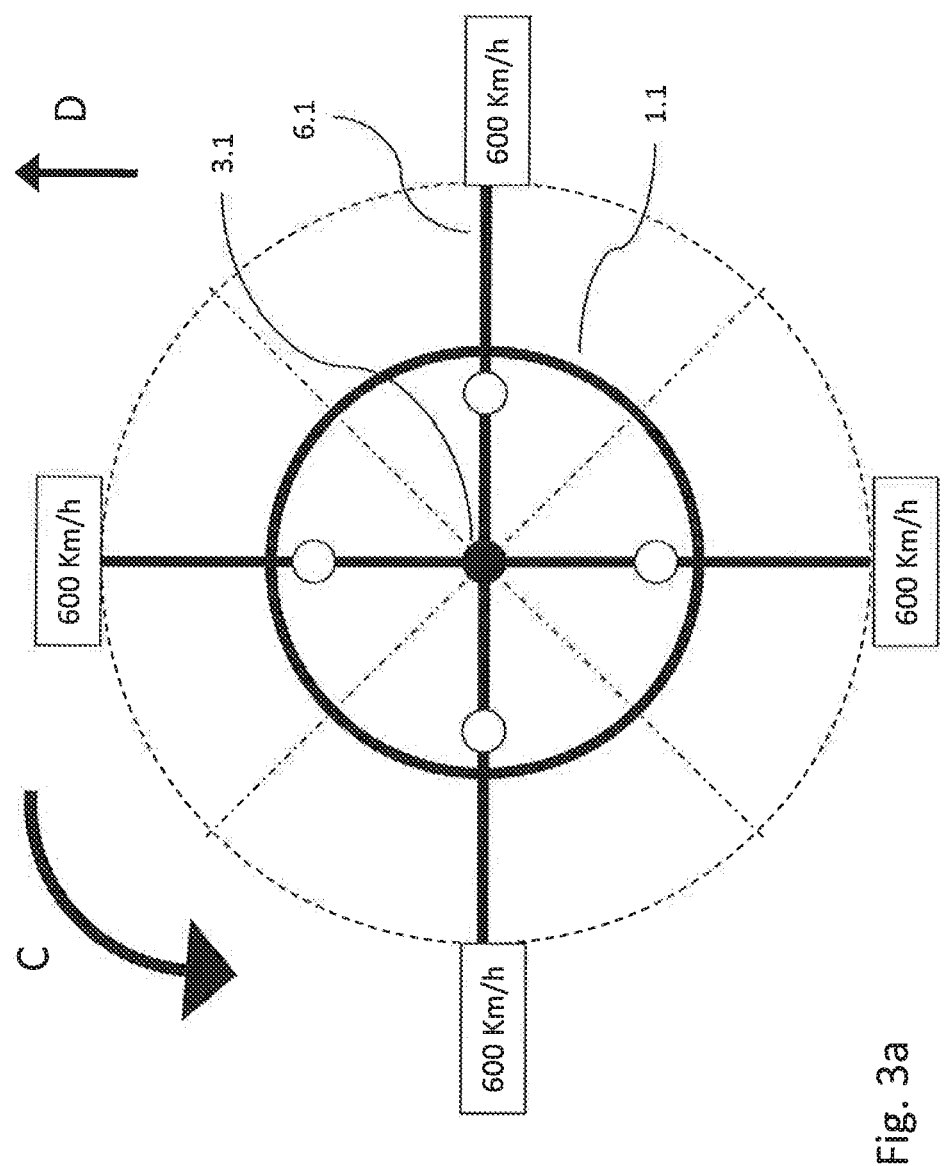
FIG. 3a is a top view of a rotor of a helicopter according to the invention in an undeflected state of the rotor head showing one of different rotor blade positions.
Figure 3B:
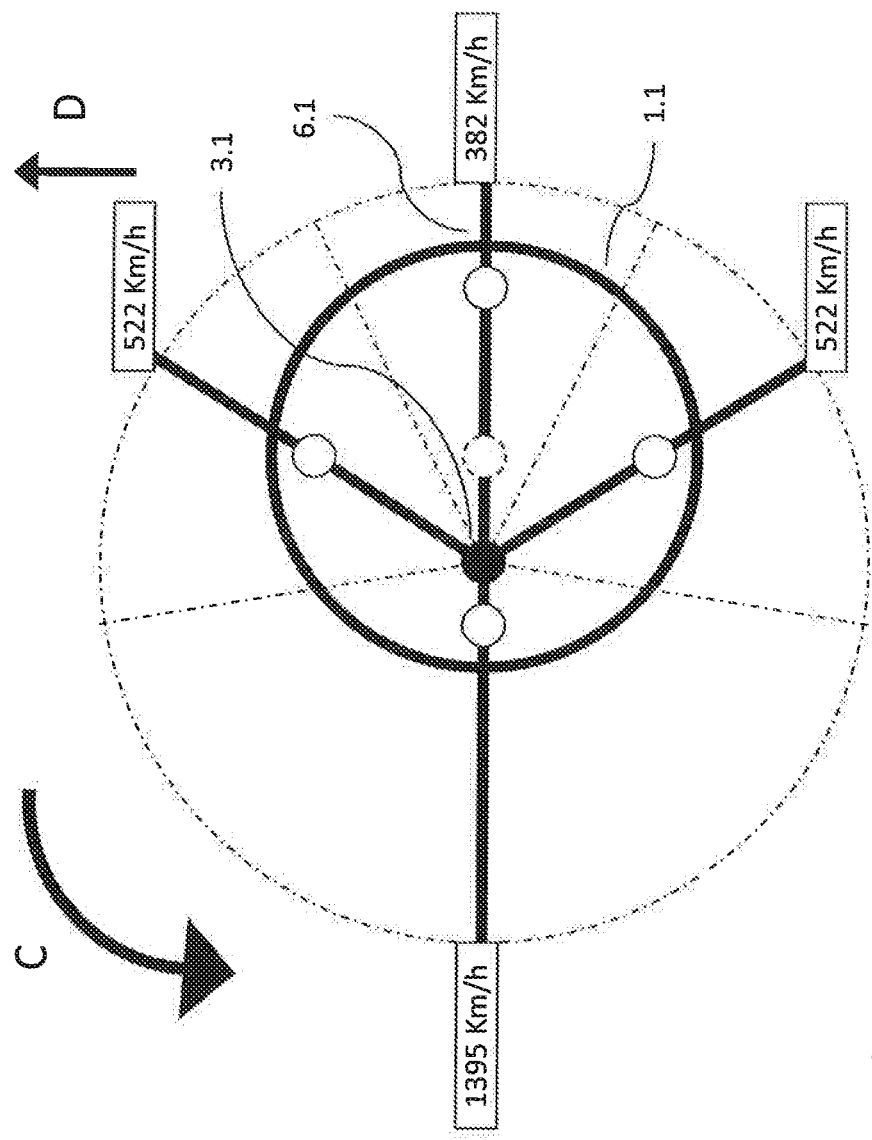
FIG. 3b is a top view of a rotor of a helicopter according to the invention in a deflected position of the rotor head with another of different rotor blade positions.
Figure 3C:
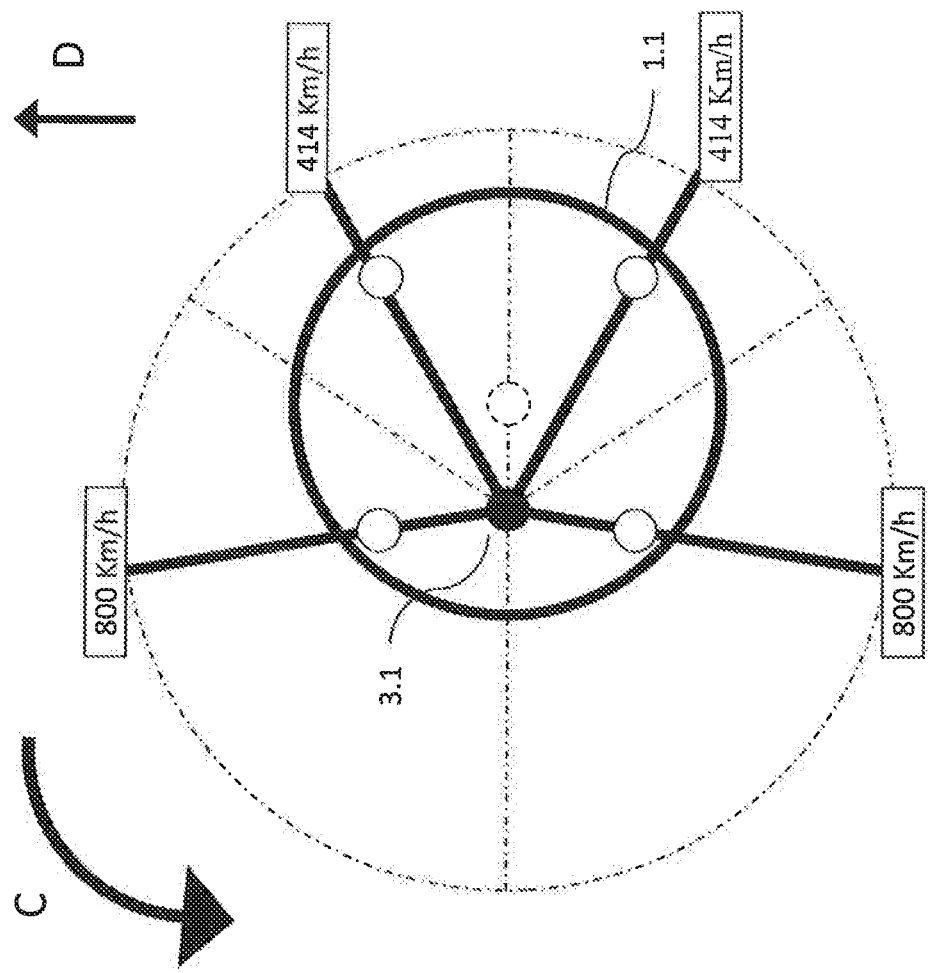
FIG. 3c is a top view of a rotor of a helicopter according to the invention in a deflected position of the rotor head with another of different rotor blade positions.

The conditions provided by this means are illustrated in FIGS. 3a to 3c with a top view from above. The direction of rotation C of the rotor blades and the flight direction D of the helicopter are indicated here. FIG. 3a shows the neutral or starting position of rotor bearing shaft 3.1 and drive shaft 1.3. At a given angular speed transmitted by the drive shaft 1.3 to the rotor blades 6.1, the same rotational speed, such as here, for example, 600 km/h, is produced at the outer ends of each of the rotor blades 6.1. In the case of an anticlockwise rotor, the rotor bearing shaft 3.1 in the illustration of FIGS. 3b and 3c or when looking in the flight direction D (FIG. 2) is moved to the left relative to the drive shaft 1.3 at a high flight or translational speed of the helicopter. This has the effect that, in a rotational position of the rotor at which two rotor blades 6.1 extend in alignment with each other perpendicular to the flight direction F, the left rotor blade as seen in the flight direction F (in the view of FIGS. 2, 3b), given an identical angular speed as in FIG. 3a, at its outer end has a substantially greater rotational speed (relative to the helicopter body 1), here 1395 km/h, because of the greater distance from the rotor drive axis A, while the right rotor blade has a significantly lower rotational speed, here 382 km/h. Without taking further influences into consideration, a stall is already taking place at the left rotor blade since the tip of the rotor blade moves at supersonic speed.

At a translational speed of the helicopter of 300 km/h, the two outer ends of the rotor blades therefore have rotational speeds at which a stall still does not take place despite the higher speed of the helicopter. The resulting speeds above ground for the left and right rotor blade are 1095 km/h and 682 km/h for the present example. In theory, the left and right rotor blade move here with the same rapidity over ground when the helicopter moves in the flight direction D with a translational speed of 888 km/h.

Since the rotor bearing axis B of the rotor bearing shaft 3.1 and the rotor drive axis A of the drive shaft 1.3 come apart, at an identical angular speed of the rotor drive axis A the angular speed of the rotor blades 6.1 about the axis of rotation A of the rotor changes sinusoidally—the rotor blade on the left in the direction of view of FIG. 3b sweeps over a larger angle in the same time than the right rotor blade. Therefore, the rotor blades 6.1 must not be connected (by their rotor blade shafts 6) to the rotor bearing shaft 3.1 in a rotationally fixed manner and are also not. Their relative angular position changes during the revolution, as in particular the comparison of FIGS. 3b and 3c shows. Simultaneously swept-over angular regions of the individual rotor blades are indicated in FIGS. 3b, 3c by chain-dotted lines.

According to FIG. 1, the rotor head 2 substantially has five segments (from the bottom to the top in FIG. 1): bearing segment 2.1, rotor blade segment 2.2, central scissor-type segment 2.3, additional rotor blade segment 2.4 and a rotor cover segment 2.5. In the rotor blade segment 2.2, the drive shaft 1.3 is connected to the lower rotor rings 8.1 which are connected in turn to oscillating bearings 7 in a rotatable manner. The oscillating bearings 7 for their part receive the rotor blade shafts 6. The upper rotor rings 8.2 are connected to the oscillating bearings 7 above the latter. Said upper rotor rings 8.2 of the rotor blade segment 2.2 are, for their part, connected to the lower additional rotor rings 8.3 of the additional rotor blade segment 2.4 via the intermediate plate 9 of the central scissor-type segment 2.3. Analogously to the rotor blade segment 2.2, the lower additional rotor rings 8.3 are connected via additional oscillating bearings 7.1 of the additional rotor blade segment 2.4 to the upper additional rotor rings 8.4 which, together with a rotor cover 11, form the rotor cover segment 2.5.

In the mounting part of the rotor head 2, the sinusoidal adjuster 1.1 has a motorized adjustment device (threaded spindle, bearing slide with sliding rail) for the mounting and displacement of the rotor shaft 3. The amplitude of the displacement of the latter by the sinusoidal adjuster 1.1 can depend in particular on the translational speed of the helicopter and serves to correspondingly move the rotor blade shafts 6.

As already stated, the rotor shaft 3 is divided here into three parts: rotor bearing shaft 3.1, additional rotor bearing shaft 3.2 and rotor guide shaft 3.3. The rotor shaft blade bearings 4 are connected to the rotor bearing shaft 3.1 and to the rotor blade shafts 6. A swashplate 1.2 is fastened both to the sinusoidal adjuster 1.1 and also, via linkages and levers, to rotary bearing blocks 5 which, in turn, are connected to the rotor blade shafts 6. The rotor blade shafts 6 are, for their part, accommodated and guided with axial bearings in the oscillating bearings 7.

The rotor bearing shaft 3.1 is connected in the central scissor-type segment 2.3 to the intermediate plate 9 via sliding pieces 9.1, as also emerges from FIGS. 1 and 4. The sliding pieces 9.1 connect the intermediate plate 9 to the additional rotor bearing shaft 3.2 in the additional rotor blade segment 2.4. The construction of the latter is similar to the rotor blade segment 2.2, with the exception of the rotary bearing blocks 5. Counterweights 10.1 for balancing an imbalance are attached instead of the rotor blades 6.1 in the rotor blade segment 2.2 to the additional rotor blade shafts 10 of the additional rotor blade segment 2.4. A guide sliding piece 13 which links the additional rotor bearing shaft 3.2 to the rotor guide shaft 3.3 is attached to the additional rotor bearing shaft 3.2. Said rotor guide shaft is connected rigidly to the rotor cover 11 via a rotor cover bearing 11.1. The rotor cover 11 itself closes off the rotor cover segment 2.5 with the upper additional rotor rings 8.4 of the drive part and the rotor cover bearing 11.1.

The drive force is transmitted by the rotor housing 2. It is therefore ensured that the rotor drive axis A is independent of the deflection movements of the rotor bearing axis B, wherein the latter is adjustable with a component perpendicular to the longitudinal axis L of the helicopter body 1 and is not restricted to the direction shown in FIG. 2, but rather can be adjusted in particular to both sides of the longitudinal axis L. The bearing segment 2.1 of the rotor housing 2 bears the helicopter body 1 in flight and transmits the drive forces from the main drive of the helicopter body 1 into the rotor head 2. The oscillating bearings 7 contained in the rotor rings 8.1 and 8.2 of the rotor blade segment 2.2 conduct the drive forces out of the rotor housing 2 via the rotor rings 8.1, 8.2 to the rotor blade shafts 6. The connected oscillating bearings 7 thereof permit the length displacements of the rotor blade shafts 6, and therefore of the rotor blades 6.1, which length displacements are guided by the rotor bearing shaft 3.1. The oscillating bearings 7 also absorb the acceleration and braking forces in the form of centrifugal and centripetal forces on the rotor blade shafts 6 and the rotor blades 6.1 and conduct said forces further to the rotor rings 8.1 and 8.2. The rotational movements of two rotor blade shafts 6 lying one above the other are synchronized by the connection of the upper rotor ring 8.2 of the rotor blade segment 2.2 to the lower additional rotor ring 8.3 of the additional rotor blade segment 2.4 via the intermediate plate 12.

The sinusoidal adjuster 1.1 brings about the displacement of the rotor bearing shaft 3.1 by movement of a bearing slide on sliding rails to which the rotor bearing shaft 3.1 is attached and therefore follows the movement. As a result, the distances of the rotor blades 6.1 from the rotor drive axis A are changed by displacement of the rotor blade shafts 6 along their orientation. The sinusoidal adjuster 1.1 is likewise connected to the swashplate 1.2 via servomotors or servohydraulics in order to set the angle of incidence of the rotor blade shaft 6 via the rotary bearing blocks 5.

In the central scissor-type segment 2.3 (see FIGS. 4 and 5), the construction of the intermediate plate 9 serves for transmitting the movement of the rotor bearing shaft 3.1 with the rotor blades fastened thereto in the rotor blade segment 2.2 to the additional rotor bearing shaft 3.2 and to the additional rotor blade shafts 10 in the additional rotor blade segment 2.4. The counterweights 10.1 at the ends of the additional rotor blade shafts 10 there balance the resulting imbalance by means of the displaced, opposite rotor blade 6.1 in the rotor blade segment 2.2. In the absence of rotor blades in the additional rotor blade segment 2.4, the setting of the angle of inclination and therefore also the rotary bearing blocks are omitted. A rotor cover bearing 11.1 constitutes a rigid connection to the rotor guide shaft 3.3.

Figure 6:
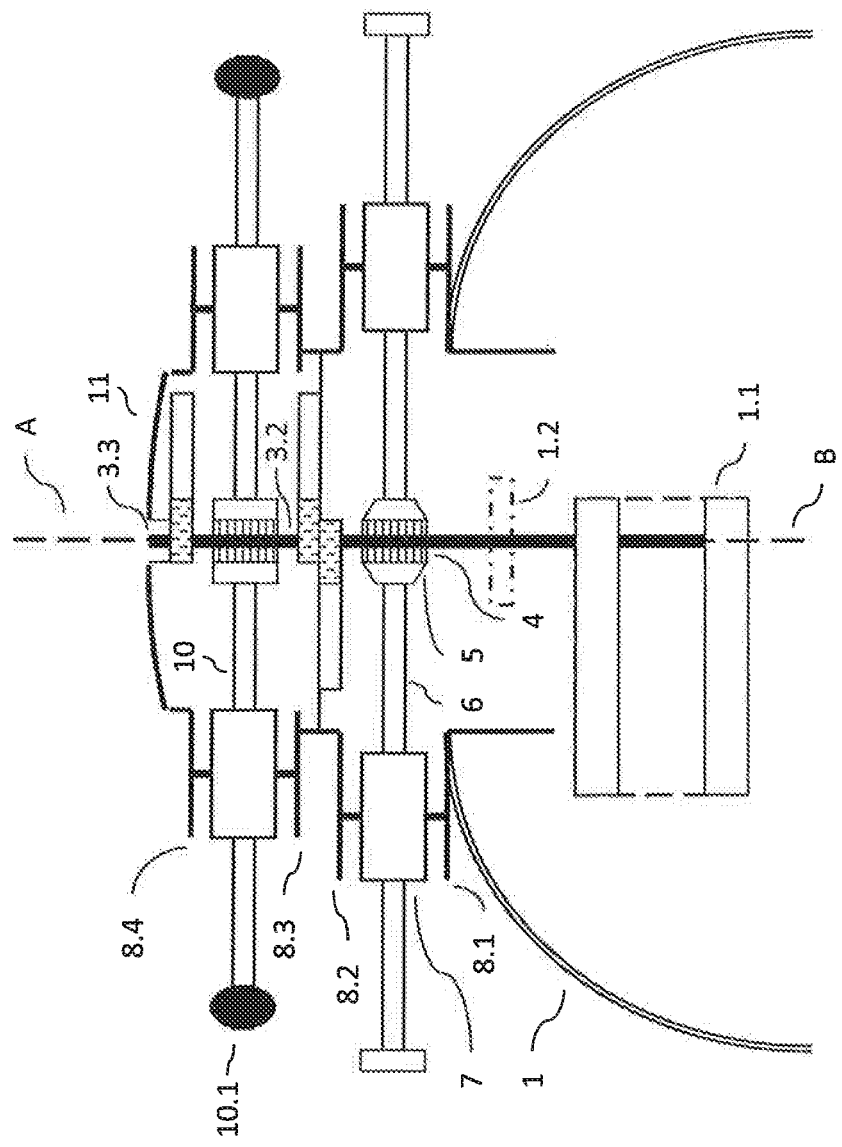
FIG. 6 is a further preferred embodiment according to the invention in longitudinal section through the undeflected rotor head, wherein the additional rotor blade shafts of the additional rotor blade segment are shortened in relation to the rotor blade shafts of the rotor blade segment and are provided with additional weights.

FIG. 6 shows a further preferred configuration of the invention with a shortening of the additional rotor blade shafts 10 in the additional rotor blade segment 2.4 in relation to the rotor blade shafts 6 of the rotor blade segment 2.2. As a result, the parameters of the counterweights 10.1 change correspondingly. This includes in particular the mass thereof. The change of in particular the mass of the counterweights 10.1 is restricted inter alia by the maximum permissible weight of the helicopter. In this case, a more compact construction of the rotor head 2, and as a result improved flight properties, can be achieved by a corresponding configuration of the additional rotor blade segment 2.4 in comparison to the lower rotor blade segment 2.2.

Figure 7:
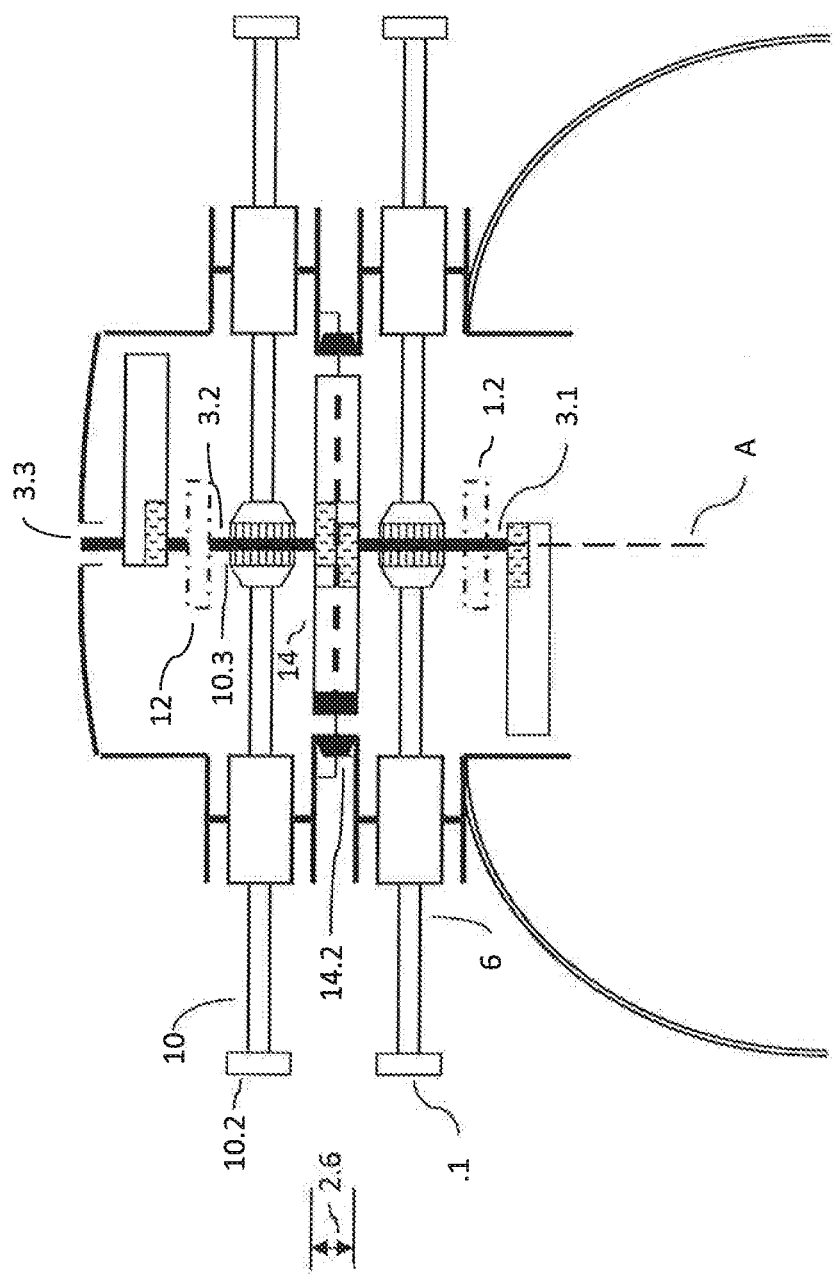
FIG. 7 is a further preferred embodiment according to the invention in the longitudinal section through the rotor head, wherein the additional rotor blade segment is configured as a coaxial rotor.

FIG. 7 shows a preferred refinement according to the invention as a further development of the coaxial rotor construction already known from the prior art. The additional rotor blade segment 2.4 is attached here coaxially above the rotor blade segment 2.2 and is provided with additional rotor blades 10.2 instead of counterweights 10.1. The additional rotor blades 10.2 rotate in an opposed manner to the rotor blades 6.1. The torques of the two rotor blade segments are thereby balanced. This construction requires an additional swashplate 12 for setting the angle of inclination of the additional rotor blades 10.2 of the additional rotor blade segment 2.4 via additional rotor rotary blocks 10.3. The preferred refinement of FIG. 7 makes provision for the rotor bearing axis B to be separated from the rotor drive axis A even in the case of a coaxial rotor system.

Figure 8:
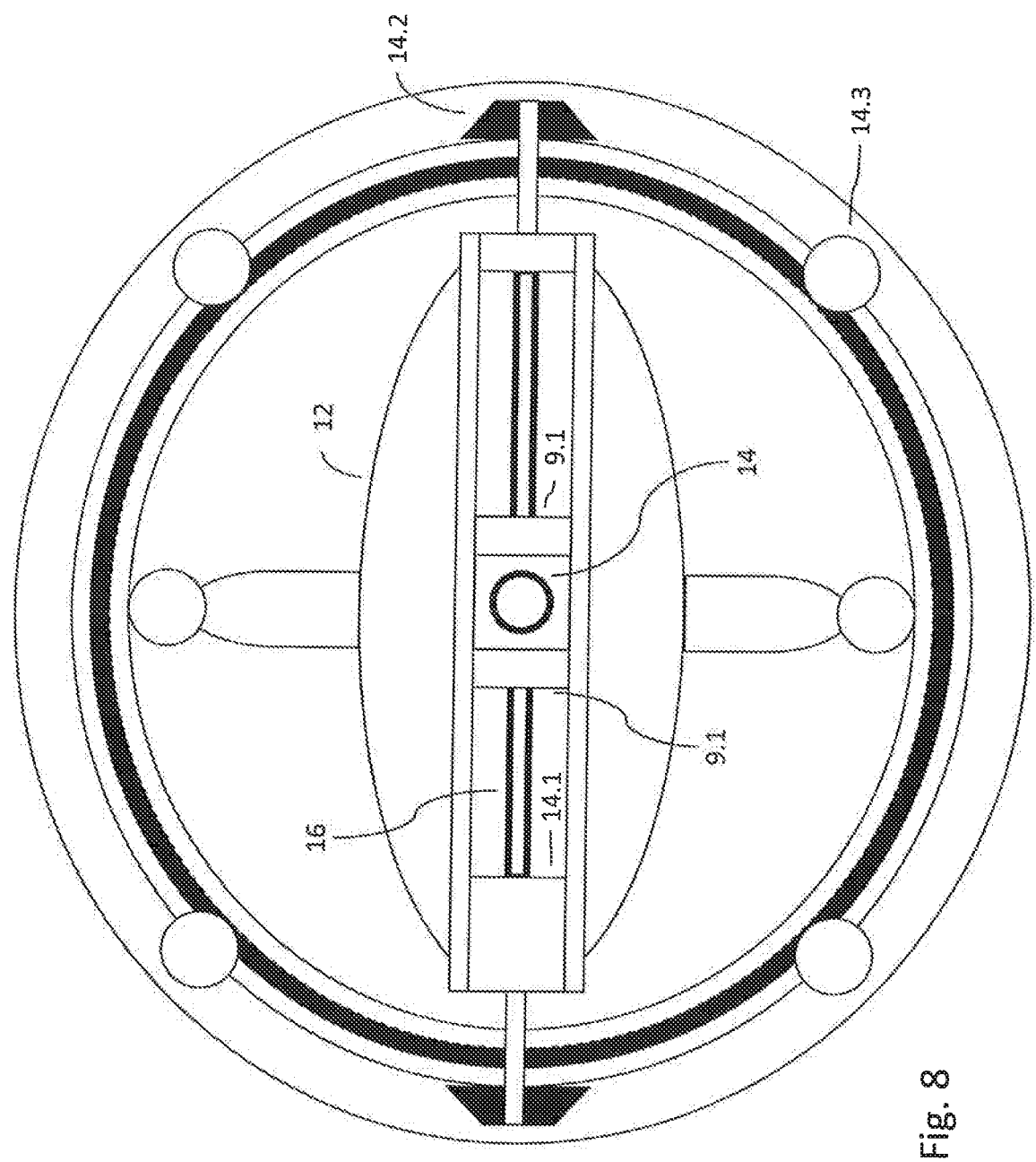
FIG. 8 is a top view of the coaxial scissor-type segment in the preferred embodiment with a coaxial rotor.

A coaxial sinusoidal adjuster 14 is mounted in a coaxial scissor-type segment 2.6 (FIG. 8). Said sinusoidal adjuster has a threaded spindle 14.1 which moves the sliding pieces 9 of the coaxial scissor-type segment 26 electrically or hydraulically. The rotor bearing shaft 3.1, which is fastened to the sliding pieces 9, and the additional rotor bearing shaft 3.2 are thereby moved in an opposed manner with respect to each other. The rotor blade shafts 6 of the rotor blade segment 2.2 and the additional rotor blade shafts 10 of the additional rotor blade segment 2.4 are thereby moved in an opposed manner with respect to one another.

In this preferred refinement, there is a swashplate 1.2 and an additional swashplate 12. While the swashplate 1.2 is attached in accordance with the previous refinements, the additional swashplate 12 is installed tilted by 180° in the additional rotor blade segment 2.4. Furthermore, additional rotor rotary blocks 10.3 which set the angle of inclination of the additional rotor blades 10.2 are present in the additional rotor blade segment 2.4. These additional rotor rotary blocks are fitted so as to run clockwise and are attached to the additional rotor blade shafts 10 of the additional rotor blade segment 2.4. The rotor blade segment 2.2 drives the additional rotor blade segment 2.4 in the opposed direction of rotation via bevel gears 14.2 in the coaxial scissor-type segment 2.6. In this case, the additional rotor blade segment 2.4 is moved by a roller mounting on a groove ring 14.3 in or on the rotor blade segment 2.2 (FIG. 8).

FIGS. 9 and 10 show a further refinement of a helicopter according to the invention, to the helicopter body 1 of which a respective aerofoil 15 is attached horizontally on both sides. The aerofoils 15 are attached at medium height of the helicopter body 1 and are mounted rotatably. By means of their rotatability about the horizontal axis by at least 90° and their flow properties, the aerofoils 15 generate an additional lift. A further pair of aerofoils 15 is arranged at the rear of the helicopter body 1, wherein the horizontal dimensions of the rear aerofoils 15 are smaller than those of the front aerofoils 15. In particular the front aerofoils 15 can be configured as an elevator unit, and therefore they are arranged as what is referred to as canards in front of the rear aerofoils 15. A rudder unit 16 in the form of a tail fin extending substantially vertically upwards is provided at the rear of the helicopter body 1.

At medium height of the helicopter body 1, a generator 17 with a primary drive 18 is provided below the aerofoils 15. The generator 17 can have, for example, fuel cells and/or accumulators and provides energy for the primary drive 18 which itself has turbines and generates an additional drive force for the helicopter. With regard to the rest of the components, reference is made to the above statements.

In the embodiment of a helicopter according to the invention that is shown in FIGS. 11 and 12, a bearing ring 19 is provided in the helicopter body 1, said bearing ring being movable in an adjustable slide 20 and the direction of movement of which is formed along the longitudinal axis L of the helicopter body 1. The rotor head 2 is connected to the bearing ring 19 and is therefore likewise adjustable in the direction of the longitudinal axis L of the helicopter body 1 such that, at high translational speeds, when the lift point of the helicopter shifts rearwards in the direction of the rear and consequently the load centre shifts forwards in the direction of the front, the centre of gravity of the lift is shifted again with respect to the (mass) centre of gravity of the helicopter by adjustment of the rotor head forwards via the bearing ring 19. As a result, stable flight positions are possible even at very high translational speeds.

While specific embodiments of the invention have been shown and described in detail to illustrate the application of the principles of the invention, it will be understood that the invention may be embodied otherwise without departing from such principles.

The invention claimed is:
1. A helicopter comprising
a helicopter body with a longitudinal axis;
a rotor head which is driven about a rotor drive axis and comprises at least two rotor blades held via one rotor blade shaft each, and a rotor bearing axis of the rotor blade shafts, which rotor blade axis is adjustable perpendicular to a rotor bearing axis direction of extent in relation to the rotor drive axis; and
a rotor shaft having a plurality of parts, wherein
the parts of the rotor shaft contain at least one rotor bearing shaft and an additional rotor bearing shaft,
the rotor head holds the at least two rotor blade shafts in at least one rotor blade segment,
there is at least one additional rotor blade segment with additional rotor blade shafts,
the additional rotor blade segment is coupled to the rotor blade segment, and
the movable parts of the rotor shaft, the rotor bearing shaft and additional rotor bearing shaft are deflectable in an opposed manner and, as a result, the rotor blade shafts and the additional rotor blade shafts are movable in an opposed manner with respect to one another.
2. A helicopter according to claim 1, wherein the rotor bearing axis is adjustable with a component perpendicular to the longitudinal axis of the helicopter body.
3. A helicopter according to claim 1, wherein the rotor bearing axis is adjustable to both sides of the longitudinal axis of the helicopter body.
4. A helicopter according to claim 1, wherein the rotor drive axis and the rotor bearing axis are formed separately from each other.
5. A helicopter according to claim 1, wherein the plurality of parts of the rotor shaft follow one another in an axial direction.
6. A helicopter according to claim 1, further comprising a sinusoidal adjuster by means of which the rotor shaft, an axis of symmetry of which is the rotor bearing axis, is adjustable perpendicular to the latter.
7. A helicopter according to claim 6, wherein at least one rotor blade shaft is connected indirectly or directly to the sinusoidal adjuster and is adjustable by the latter.
8. A helicopter according to claim 6, wherein there is a single or two-dimensional adjustability of the rotor shaft by the sinusoidal adjuster.
9. A helicopter according to claim 1, wherein at least two rotor blade shafts are connected to the rotor shaft and are adjustable with the latter.
10. A helicopter according to claim 1, wherein at least two rotor blade shafts are each guided by means of oscillating bearings.
11. A helicopter according to claim 10, wherein the transmission of the drive forces via oscillating bearings and rotor rings to the rotor blade shafts.
12. A helicopter according to claim 11, wherein the rotor rings are connected rotatably to the oscillating bearings.
13. A helicopter according to claim 11, wherein at least two of the rotor rings are coupled to one another by at least two different rotor blade segments.
14. A helicopter according to claim 1, wherein a drive of the rotor blade shafts via the rotor head.
15. A helicopter according to claim 1, wherein the rotor drive axis coincides with an axis of symmetry of the rotor head.
16. A helicopter according to claim 1, wherein at least two parts of the rotor shaft are movable perpendicular to the rotor bearing axis.
17. A helicopter according to claim 1, wherein at least part of the rotor shaft is rigid in relation to the rotor head.
18. A helicopter according to claim 1 wherein at least part of the rotor shaft is connected to the rotor head or the components thereof.
19. A helicopter according to claim 1, wherein one or more rotor blade shafts are fastened independently of one another to at least part of the rotor shaft.
20. A helicopter according to claim 1, wherein at least two rotor blade shafts are connected independently of one another to a swashplate.
21. A helicopter according to claim 20, wherein there is at least one additional swashplate and the latter activates at least one additional rotor blade segment.
22. A helicopter according to claim 21, wherein at least one of the swashplates is coupled to at least one of the additional swashplates.
23. A helicopter according to claim 20, wherein at least one of the swashplates is installed in the rotor head.
24. A helicopter according to claim 20, wherein at least one of the swashplates is installed in the rotor cover.
25. A helicopter according to claim 20, wherein at least two of the swashplates and/or of the additional swashplates are connected to one another by linkages and/or levers.
26. A helicopter according to claim 1, wherein the additional rotor blade segment is arranged above and/or below the rotor blade segment.
27. A helicopter according to claim 1, wherein, on at least one of the additional rotor blade segments, counterweights are attached to the additional rotor blade shafts.
28. A helicopter according to claim 27, wherein the counterweights comprise solid, liquid or gaseous material.
29. A helicopter according to claim 27, wherein the mass of the counterweights is temporally constant or variable.
30. A helicopter according to claim 1, wherein the coupling of the rotor blade segment to the additional rotor blade segment is brought about via a scissor segment.
31. A helicopter according to claim 30, wherein the scissor segment has sliding pieces.
32. A helicopter according to claim 1, wherein at least one of the additional rotor blade shafts of the additional rotor blade segment has the same constructional form as one of the rotor blade shafts of the rotor blade segment.

33. A helicopter according to claim 32, wherein corresponding lengths of at least one additional rotor blade shaft with respect to at least one of the rotor blade shafts.

34. A helicopter according to claim 33, wherein at least one additional rotor blade segment has at least one additional rotor blade shaft with a changed length in relation to at least one rotor blade shaft.

35. A helicopter according to claim 1, wherein at least one additional rotor blade segment is provided with additional rotor blades.

36. A helicopter according to claim 1, wherein the direction of rotation of the rotor blade segment is coupled to that of at least one additional rotor blade segment.

37. A helicopter according to claim 36, wherein a coupling of the rotor blade segment to one of the additional rotor blade segments via bevel gears in a groove ring which is provided in a coaxial scissor-type segment.

38. A helicopter according to claim 1, wherein aerofoils and/or rudder units are arranged on the helicopter body.

39. A helicopter according to claim 1, wherein a generator is provided as the primary drive in the helicopter body.

40. A helicopter according to claim 39, wherein the primary drive has turbines, piston engines, fuel cells and/or accumulators.

41. A helicopter according to claim 1, wherein a bearing ring is mounted movably in an adjustable slide in the helicopter body, wherein the bearing ring is connected to the rotor head and the bearing ring is displaceable with the rotor head in the direction of the longitudinal axis of the helicopter body.

* * * * *